(12) United States Patent
Farrugia et al.

(10) Patent No.: US 8,775,826 B2
(45) Date of Patent: Jul. 8, 2014

(54) COUNTERACTING MEMORY TRACING ON COMPUTING SYSTEMS BY CODE OBFUSCATION

(75) Inventors: Augustin J. Farrugia, Cupertino, CA (US); Mathieu Ciet, Paris (FR); Pierre Betouin, Boulogne (FR)

(73) Assignee: Apple Inc., Cupertino, CA (US)

( * ) Notice: Subject to any disclaimer, the term of this patent is extended or adjusted under 35 U.S.C. 154(b) by 322 days.

(21) Appl. No.: 13/024,273

(22) Filed: Feb. 9, 2011

(65) Prior Publication Data
US 2012/0204039 A1    Aug. 9, 2012

(51) Int. Cl.
*G06F 12/14* (2006.01)
(52) U.S. Cl.
USPC ........... 713/190; 713/187; 713/188; 713/189; 726/26; 726/27; 717/110; 717/120

(58) Field of Classification Search
USPC ...................... 713/194, 187–190; 726/26, 27; 717/106, 110, 120, 136
See application file for complete search history.

(56) References Cited

U.S. PATENT DOCUMENTS

2007/0234070 A1* 10/2007 Horning et al. ............... 713/190

* cited by examiner

*Primary Examiner* — Amare F Tabor
*Assistant Examiner* — Noura Zoubair
(74) *Attorney, Agent, or Firm* — Adeli LLP

(57) ABSTRACT

Method and apparatus for obfuscating computer software code, to protect against reverse-engineering of the code. The obfuscation here is on the part of the code that accesses buffers (memory locations). Further, the obfuscation process copies or replaces parts of the buffer contents with local variables. This obfuscation is typically carried out by suitably annotating (modifying) the original source code.

21 Claims, 2 Drawing Sheets

COUNTERACTING MEMORY TRACING ON COMPUTING SYSTEMS BY CODE OBFUSCATION

FIELD OF THE INVENTION

This invention relates to computers, more specifically to computer security, and even more specifically to preserving the security of computer software using code obfuscation.

BACKGROUND

The nature of software renders it susceptible to analysis and copying by third parties. There have been considerable efforts to enhance software security, see for instance U.S. Pat. No. 6,668,325 assigned to Intertrust Technologies Inc. There have been several efforts to provide technical protection for software. A well-known protection approach is called obfuscation, which typically relies on a rearrangement of the source code. Computer code (software or programs) comes in two chief types; the first is source code, which is as written by a human being (programmer) in a particular computer language. The source code itself is often then obfuscated. The other chief type is called object code or compiled code or binary code or machine code. This is the source code after having being processed by a special type of computer software program called a compiler; a compiler is routinely provided for each computer language. The compiler takes as input the alphanumeric character strings of the source code as written by the programmer, and processes them into a string of binary ones and zeros, which can then be operated on by a computer processor.

It is also known to obfuscate the compiled (binary) code. The term "code morphing" is also applied to obfuscating compiled code. This is typically achieved by completely replacing a section of the compiled code with an entirely new block of compiled code that expects the same machine (computer or processor) state when it begins execution as a previous code section and will leave with the same machine state after execution as does the original code (thereby being semantically equivalent code). However, typically a number of additional operations compared to those of the original code will be completed, as well as some operations with an equivalent effect, by the morphed code. Code morphing makes disassembly or decompiling of such a program much more difficult. This is typically the act of taking the machine code and transforming it back into source code, and is done by reverse engineers or "hackers" who wish to penetrate the compiled code, using a special decompiler program. A drawback with code morphing is that by unnecessarily complicating operations and hindering compiler-made optimizations, the execution time of the obfuscated code is increased. Thus typically code morphing is limited to critical portions of a program and so is often not used on the entire computer program application. Code morphing is also well known for obfuscating copy protection or other checks that a program makes to determine whether it is a valid, authentic installation or a pirated copy, for security purposes.

Therefore, typically the goal of obfuscation is to start with the original code and arrive at a second form of the code, which is semantically or logically equivalent from an input/output point of view. As pointed out above, this means that for any input to the code in the field of possible inputs, the output value of the code is the same for both the original code and the obfuscated code. Thus a requirement of successful obfuscation is to produce a semantically equivalent (but also protected) code to the original (unprotected) code.

As well known, computer programs called obfuscators or tools may perform the obfuscating; they transform a particular software application (program) in source or compiled code form into one that is functionally identical to the original, but is much more difficult for a hacker to penetrate, that is to decompile. Note that the level of security from obfuscation depends on the sophistication of the transformations employed by the obfuscator, the power of the available deobfuscation algorithms as used by the hacker, and the amount of resources available to the hacker. The goal in obfuscating is to provide many orders of difference between the cost (difficulty) of obfuscating vs. deobfuscating.

Hence it is conventional that the obfuscation process is performed at one location or in one computer (machine) after the source code has been written. The obfuscated code is compiled and then transferred to a second computer/processor where it is to be executed after installation in associated memory at the second computer. (Note that the normal execution does not include any disassembling since there is no need on a machine-level basis to reassemble the code. Disassembly is strictly done for reverse engineering purposes.) At the second (recipient) computer, the obfuscated code is installed and then can be routinely executed by the processor at the second computer. The obfuscated code is executed as is. The obfuscated code is often slower to execute than the original code.

Implementations of security related computer code running on "open platform" systems are often subject to attack in order to recover cryptographic materials (keys, etc.), cryptographic algorithms, etc. The attack are mostly designated here by the term "reverse-engineering", which is the way to recover code internals from a software binary (compiled code). Open platform means that internal operations of the computing system are observable by an attacker. This also means that under some circumstances the attacker can break into the computer program, modify values, modify instructions, or inject his own code.

Several solutions are known to protect computer software code against reverse-engineering. They are implemented to make more complex the work of attackers in understanding the process, or to hide cryptographic data or operation.

In obfuscation, the code is typically re-written by a software "tool," in a very complex way. Then, an attacker must provide substantial additional work to recover something (humanly) understandable from the compiled code. This obfuscation includes—for instance—re-writing loops, splitting basic blocs of instructions (adding jump in the code, using predicates), flattening the control flow (not executing linear blocks of code), etc.

However, in some circumstances, attackers try to determine the aim of one (or a set) buffers in memory in the whole process. This is called memory tracing and uses other easily available software called a memory tracing tool or a debugger. Memory tracing that occurs only on small identified parts of the program is often the simplest approach for an attacker.

SUMMARY

In accordance with the invention, an obfuscation technique is provided for source (or compiled) code. The code is modified by a particular obfuscating function or tool. Thus, rather than installing or downloading the original compiled code, instead the obfuscated code is compiled then downloaded or installed in the second (recipient) computer or computing device. Of course, computer devices here include for instance mobile telephones, cable television set top boxes, personal computers, laptop computers, personal digital assists, etc.

The code is never deobfuscated at execution since that would degrade its security. As well known, there exist many programs semantically equivalent to the original (preobfuscation) code. They normally are not identical; that is what is meant by semantically or logically equivalent. Then this equivalent compiled code, which is executable, is installed on the recipient (target) device.

In most conventional computer operating systems, two general types of memory organization are intensively used: the stack and the heap. A stack is a last in-first out data structure. The "push" operation adds to the top of the stack and the "pop" operation removes an item from the tope of the stack. To simplify, all the local variables are stored within the stack memory section whereas all the elements declared with a dynamic allocation (malloc, calloc . . . ) are stored in the heap memory section. The stack has a limited length, defined either by the system (in the Apple, Inc. MacOS operating system) or the executable (in the Microsoft Windows operating system). Other types of operating system memory exist, and the present methods can be generalized to any kind of memory type.

In accordance with the invention, to access and modify a given local variable through different functions and sub-functions, the access is performed through an indirection (a memory pointer) using what is called here a local variable. Thus the system does not work with the content (value) of the variable but with the memory location of the variable.

The present process is described here in the context of the stack memory. Directing the present method to the stack memory hardens against the work of the attacker's memory tracing tool (debugger). This example of the stack memory is not limiting. Such a tracing tool allows the attacker to track each modification/access performed on a defined range of memory. Then, given a buffer, typically in the heap memory, when the attacker knows the reference address of this buffer (and its size), he can track the modifications and/or the accesses of the buffer elements can be achieved using a tool tracing the memory. In the computer field, a buffer is a portion of a computer readable memory used to hold data. Of course the buffers correspond to a physical (hardware) memory.

Once accesses and modifications locations have been identified by the debugging tool, the reverse-engineer attacker focuses on operations dedicated to each buffer modification or access. Then the work of the attacker is simplified since the number of instructions is drastically reduced and the reverse-engineering becomes a set of sub-problems instead of attacking the entire code.

The present disclosure is directed to a solution to harden against such reverse-engineering of computer code based on memory tracing. This kind of attack is powerful and hard to protect against. This hardening here includes copying or replacing the content or a part content of a buffer with a local variable. The present solution is easy to develop and integrate and is highly configurable. The complexity of the resulting obfuscated code is greater, but the performance remains almost the same as that of the original code.

Provided here is the tool to create the obfuscated code, the associated method applied to the code, and also the execution of the obfuscated code.

This method can be combined with all the other techniques known for obfuscating computer code, both source code and compiled code.

DETAILED DESCRIPTION

Figure 1:
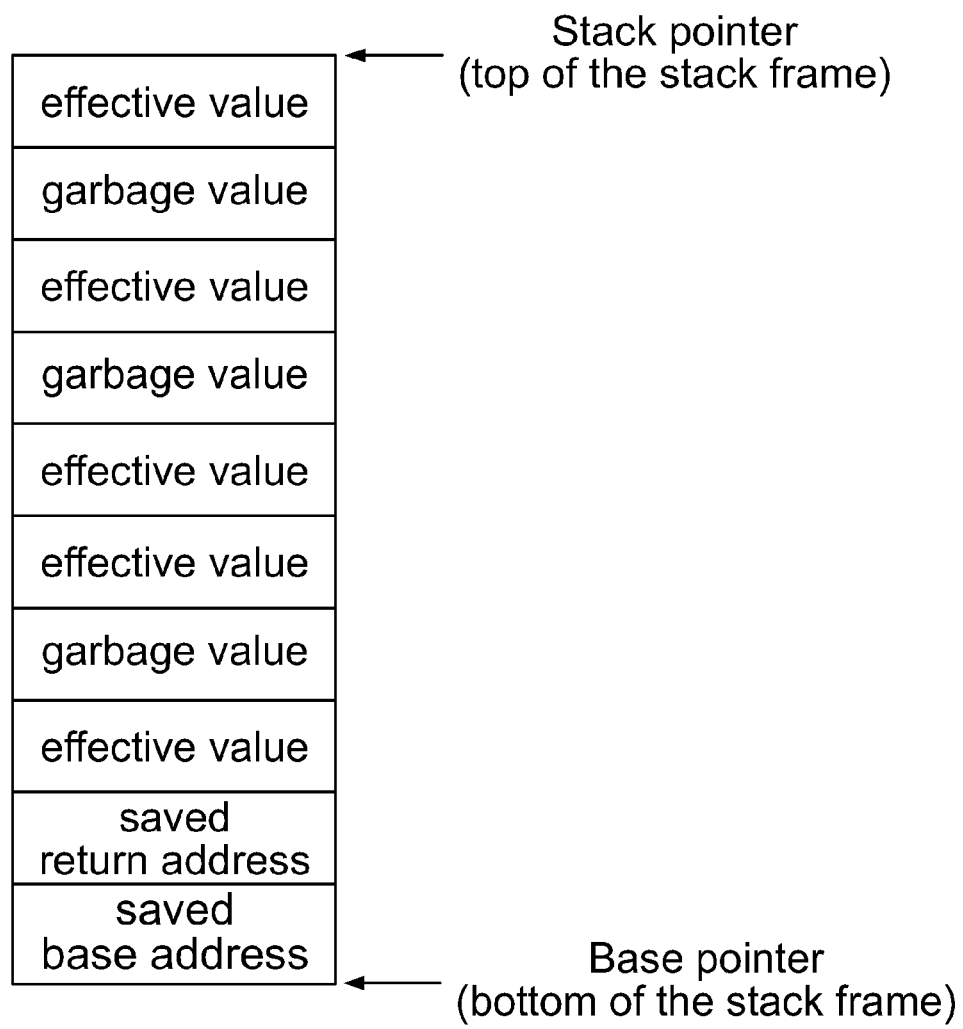
FIG. 1 shows a stack in accordance with the invention.

Consider a buffer designated T allocated in the heap memory in a computer system. Also consider a simple function designated toto (see below) taking as one of its parameters buffer T: toto(T, . . . ).

Instead of accessing buffer T directly as is conventional, disclosed here is an obfuscation tool (and method) of copying or replacing completely or part of the buffer contents inside numerous local variables which are then stored on the stack memory, where the in/out traffic is usually most intensive and so hardening is the most useful. Each time the copied or replaced data elements stored in the buffer are to be accessed, the obfuscated program instead accesses the instance stored in the local variable. At the end of the function only or when needed (this may involve changing the function parameters) each of the local variables is copied back into the buffer entry (location) from it was previously copied. In the case of the total replacement of the buffer contents, all the operations are directly performed on the instance which is stored in the stack.

The easiest (but not only) way to specify that a buffer is to be modified in this way is to use an explicit annotation on this buffer in the source code. Note that such code annotations are not compiled by the compiler so an attacker cannot obtain them from the compiled code. Alternatives are to change all of the code or change randomly selected parts of the code.

The following is an exemplary algorithm (tool) to modify original source code in this way, expressed in pseudo-code (non-executable) form:

```
Parse the code to check if annotated buffer not yet treated
    if annotated buffer not treated
        define a set n (smaller than the buffer size) (depending on a security parameter or randomly)
of local (to the function) variables of the same type as the buffer (if this is an array of bytes, the declared local variables
are byte each)
            define a set S of n positions in the buffer
            for the n positions in the buffer, add code to make a copy of the value in the buffer into one
of the variable (note the code to make the copy can be put anywhere in the code, before or after the first use of the
buffer and/or the given position), OR directly place the content of the buffer in stack, when function begins, in case of
complete replacement.
                when accessing to one of the positions defined in S, replace the code T[?] by the use of the
related variable
                    if there is a function using as input the buffer T, change the APIs of the function and add the
set of local variables (f(T) is replaced by f(T, &localVar0, &localVar1, ...) where "&" denotes the address)
                        add at the end of the function a copy to re-set the buffer (re-storing the local variables in the
buffer)
                    end of if
    End of parsing
```

One may add complexity to this process by, for instance, adding some copies of the original buffer in temporary variables, handling a part of the process, then storing the temporary variables (or a part of them) in the buffer, putting in the temporary variables (restored in the buffer) some other elements of the buffer and then continuing the process. The goal is to play with variables (which are copied) and the buffer, plus adding multiple copies. This allows changing both memory content and temporary variables dynamically during the execution process.

This method may be combined with other known methods in the field of code obfuscation. Indeed, the present method does not exclude the use of any other code obfuscation method.

This example illustrates this obfuscation method using copying:

The original (source) code (expressed in the C computer language here) is:

Main function:

```
unsigned char *T;
T = malloc(20);
toto(T);
printBuffer(T, 20) /* not detailed */
free(T);
return;
``` where malloc means memory allocation to define a buffer T having 20 elements, and where subroutine (call) toto(.) is defined as:

```
unsigned int i;
for(i = 0; i < 20; i++);
    T[i] = i;
for(i = 0; i < 10; i++)
    T[2*i] = 2*T[i];
tata(T);
return;
``` and where subroutine (call) tata(.) is defined as:

```
unsigned int i;
for(i = 0; i < 10; i++)
    T[2*i + 1] = T[i] + 1;
return;
```

This source code is, in accordance with the invention modified to be:

Main function (as before):

```
unsigned char *T;
T = malloc(20);
toto(T);
printBuffer(T,20);
free(T);
return;
``` where toto(.) is now defined as:

```
unsigned int i;
unsigned char p0, p1, p2, p3;
for(i= 1; i < 19; i++);
    T[i] = i;
p0 = 0;          /* garbage     */
p1 = 19;         /* values      */
```

-continued

```
p2 = T[5];
p3 = T[8];
p3 = 2*p3;
for(i = 1; i < 4; i++)
    T[2*i] = 2*T[i];
for(i = 5; i < 10; i++)
    T[2*i] = 2*T[i];
tata(T, &p0, &p1, &p2, &p3);
return T[0]=p0: T[19]=p1; T[5]=p2; T[8]=p3;
``` and where tata(.) is now defined as:

```
unsigned int i;
p1++;
for (i = 0; i < 2; i++)
    T[2*i+1] = T[i] + 1;
for (i = 3; i < 9; i++)
    T[2*i+1] = T[i] + 1;
p2++;
return;
```

Per the comments in the code delineated by "/*" and "*/", the new temporary variables p0 and p1 are assigned to have value 0 and 19 referred to as "garbage" values, while variables p2 and p3 respectively refer to the addresses of the 6th to 9th elements in buffer T to fool the attacker. These temporary variables p0, . . . , p3 are part of the code annotation provided by the obfuscation tool, where p1, p2 are also used in the annotated tata subroutine.

FIG. 1 shows diagrammatically the resulting stack memory with the stack pointer and base pointer. This example is simple since it only deals with one buffer T, but one can see how the original code is made more complex (obfuscated) by this process. Note also the example is applied only on 4 bytes—actually elements—(p0, p1, p2, p3) which are set S above of the buffer T chosen randomly and do not restore in the middle of the program or include other variants.

Finally, this obfuscation technique may be used only on the middle of the code, not making the changes at the beginning (subroutines) as above. One could also apply the method inside the tata( ) function. So the definition of $p_i$ is at the tata(.) subroutine level. Hence there are many different ways to use this method resulting in the equivalent code from an input/output point of view, but very different code from a reverse-engineering point of view.

The present software tool and method allows one to add complexity against an attacker reverse-engineering the code by monitoring the memory and the accesses to some buffers located in the heap, for instance.

To summarize, there are two main ways to proceed in accordance with the invention:

First: In the copying mode, keep the original buffer contents and define the scope (in terms of which buffers) of the obfuscation as in the above example. When the obfuscation is applied, the buffer is partitioned into several different local variables on the memory stack and further processing related to this buffer (within the obfuscation scope) uses the local variables.

Second: In the replacing mode as explained above using the tata subroutine, the original buffer is completely removed from i.e., no longer referred to by, the source code and local variables are substituted in order to host the original buffer values. All operations concerning the original buffer are then performed on the local variables directly. The buffer content can still be propagated to sub-functions using stack frame addressing (a static address in the stack).

Note that in either case the code is modified so that at its execution the variables copies or replacements are taken into account.

Figure 2:
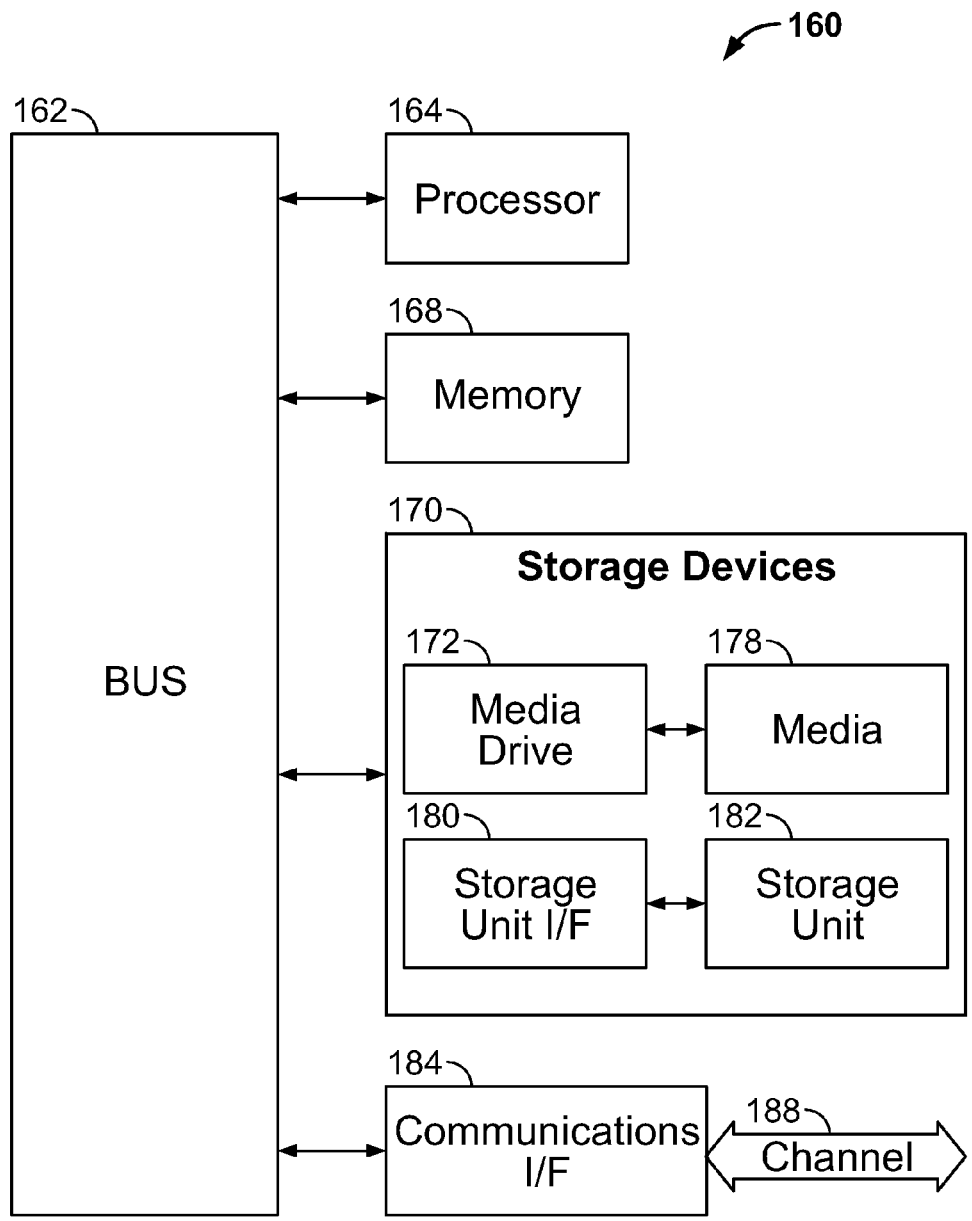
FIG. 2 shows a conventional computing device used in accordance with the invention.

FIG. 2 shows in a block diagram relevant portions of a computing device (system) in accordance with the invention for carrying out the present processes. This is, e.g., a computer, server, or part of such a device and includes conventional hardware components executing in one embodiment software (computer code) embodying the above examples of a code protection process. This code may be, e.g., in the C or C++ computer language or its functionality may be expressed in the form of firmware or hardware (circuitry) logic; writing such code or designing such logic would be routine in light of the above disclosure.

Use of the obfuscating tool (which is written in any convenient computer language such as C or C++, and need not be in the same language as the code to be obfuscated, is as follows: First, the original source code to be obfuscated is input to the tool, to produce (e.g., to annotate) the source code. Then this obfuscated source code is compiled conventionally into compiled code. (In other embodiments the compiled code is obfuscated.) Then the compiled code is conventionally distributed to users, such as in the form of an application program. From the user's standpoint the obfuscated compiled code functions identically when executed on his computing platform to the original source code.

Computer code in terms of the above described developer's tool and the (conventional) compiler is conventionally stored in memory (computer readable storage medium, e.g., RAM or ROM) associated with a processor for in the computing system execution by the processor. The incoming source code embodying the cryptographic or other computer enabled process to be protected is received at a port of the computing system and stored in a computer readable storage medium (memory, e.g., RAM) where it is coupled to the processor. The processor conventionally partitions the code into suitable sized blocks at a partitioning module. Other software (code) modules executed by the processor carry out the obfuscation functionality set forth above.

FIG. 2 thus illustrates a typical and conventional computing system 160 that may be employed to implement processing functionality in embodiments of the invention for (1) protecting (obfuscating) the code as described above or (2) executing the protected code (which is conventional code execution). Computing systems of this type may be used in a computer server or user (client) computer or other computing device, for example. Those skilled in the relevant art will also recognize how to implement embodiments of the invention using other computer systems or architectures. Computing system 160 may represent, for example, a desktop, laptop or notebook computer, hand-held computing device (personal digital assistant (PDA), cell phone, palmtop, etc.), mainframe, server, client, or any other type of special or general purpose computing device as may be desirable or appropriate for a given application or environment. Computing system 160 can include one or more processors, such as a processor. Processor 164 can be implemented using a general or special purpose processing engine such as, for example, a microprocessor, microcontroller or other control logic. In this example, processor 164 is connected to a bus 162 or other communications medium.

Computing system 160 can also include a main memory 168, such as random access memory (RAM) or other dynamic memory, for storing information and instructions to be executed by processor 164. Main memory 168 also may be used for storing temporary variables or other intermediate information during execution of instructions to be executed by processor 164. Computing system 160 may likewise include a read only memory (ROM) or other static storage device coupled to bus 162 for storing static information and instructions for processor 164.

Computing system 160 may also include information storage system 170, which may include, for example, a media drive 162 and a removable storage interface 180. The media drive 172 may include a drive or other mechanism to support fixed or removable storage media, such as flash memory, a hard disk drive, a floppy disk drive, a magnetic tape drive, an optical disk drive, a compact disk (CD) or digital versatile disk (DVD) drive (R or RW), or other removable or fixed media drive. Storage media 178 may include, for example, a hard disk, floppy disk, magnetic tape, optical disk, CD or DVD, or other fixed or removable medium that is read by and written to by media drive 72. As these examples illustrate, the storage media 178 may include a computer-readable storage medium having stored therein particular computer software or data.

In alternative embodiments, information storage system 170 may include other similar components for allowing computer programs or other instructions or data to be loaded into computing system 160. Such components may include, for example, a removable storage unit 182 and an interface 180, such as a program cartridge and cartridge interface, a removable memory (for example, a flash memory or other removable memory module) and memory slot, and other removable storage units 182 and interfaces 180 that allow software and data to be transferred from the removable storage unit 178 to computing system 160.

Computing system 160 can also include a communications interface 184. Communications interface 184 can be used to allow software and data to be transferred between computing system 160 and external devices. Examples of communications interface 184 can include a modem, a network interface (such as an Ethernet or other network interface card (NIC)), a communications port (such as for example, a USB port), a PCMCIA slot and card, etc. Software and data transferred via communications interface 184 are in the form of signals which can be electronic, electromagnetic, optical or other signals capable of being received by communications interface 184. These signals are provided to communications interface 184 via a channel 188. This channel 188 may carry signals and may be implemented using a wireless medium, wire or cable, fiber optics, or other communications medium. Some examples of a channel include a phone line, a cellular phone link, an RF link, a network interface, a local or wide area network, and other communications channels.

In this disclosure, the terms "computer program product," "computer-readable medium" and the like may be used generally to refer to media such as, for example, memory 168, storage device 178, or storage unit 182. These and other forms of computer-readable media may store one or more instructions for use by processor 164, to cause the processor to perform specified operations. Such instructions, generally referred to as "computer program code" (which may be grouped in the form of computer programs or other groupings), when executed, enable the computing system 160 to perform functions of embodiments of the invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 160 using, for example, removable storage drive 174, drive 172 or communications interface 184. The control logic (in this example, software instructions or computer program code), when executed by the processor 164, causes the processor 164 to perform the functions of embodiments of the invention as described herein.

This disclosure is illustrative and not limiting. Further modifications will be apparent to these skilled in the art in light of this disclosure and are intended to fall within the scope of the appended claims.

We claim:

1. A method of protecting computer program source code, the method comprising:
    receiving a portion of computer program source code that accesses a set of memory locations in a heap memory structure, the portion comprising a set of references to the set memory locations;
    protecting the portion of the computer program source code by modifying the portion to include a set of protection functions, the set of protection functions comprising:
        a set of copy functions that each copies contents of a different one of the set of memory locations in the heap memory structure to an associated variable in a stack memory structure;
        a set of reference functions that removes and replaces each of a plurality of the references to the memory locations copied by the set of copy functions with new references to the variables in the stack memory structure that are associated with the copied memory locations;
        a reset function that, after completion of execution of the protected portion using the new references added by the set of reference functions, copies a current value stored in each variable in the stack memory structure that is associated with a copied memory location back to the associated copied memory location in the heap memory structure; and
    compiling the computer program source code after the portion has been protected.

2. The method of claim 1, wherein the heap memory structure stores dynamically allocated elements.

3. The method of claim 1, wherein the set of copy functions is for:
    defining a first number of variables in the stack memory structure, the first number being less than a number of the set of memory locations in the heap memory structure;
    defining a second number of the memory locations in the heap memory structure; and
    for each of a number of memory locations in the heap memory structure corresponding to the first number, modifying the portion of the source code to copy the content of the location into a corresponding variable in the stack memory structure.

4. The method of claim 2, wherein the set of protection functions further comprises a garbage value function that instantiates at least one garbage variable onto the stack memory structure during execution of the protected portion of the computer program source code in order to obfuscate the variables in use by the computer program source code.

5. The method of claim 1, further comprising executing the compiled source code.

6. The method of claim 1, wherein the protected portion is equivalent but not identical to the portion before it was protected.

7. The method of claim 1, wherein the set of copy functions copies less than the entire set of memory locations in the heap memory structure to variables in the stack memory structure.

8. The method of claim 1, wherein the heap memory structure is a buffer.

9. The method of claim 1, wherein the portion is a function and the variables are local variables of said function.

10. A system comprising:
    a set of processing units for executing sets of instructions;
    a machine readable medium for storing a program which when executed by at least one of the processing units protects a portion of computer program source code, the portion accessing a set of memory locations in a heap memory structure, the portion comprising a set of references to the set of memory locations, the program comprising sets of instructions for:
        protecting the portion of the computer program source code by modifying the portion to include a set of protection functions, the set of protection functions comprising:
            a set of copy functions that each copies contents of a different one of the set of memory locations in the heap memory structure to an associated variable in a stack memory structure;
            a set of reference functions that removes and replaces each of a plurality of the references to the memory locations copied by the set of copy functions with new references to the variables in the stack memory structure that are associated with the copied memory locations;
            a reset function that, after completion of execution of the protected portion using the new references added by the set of reference functions, copies a current value stored in each variable in the stack memory structure that is associated with a copied memory location back to the associated copied memory location in the heap memory structure; and
        compiling the computer program source code after the portion has been protected.

11. The system of claim 10, wherein the heap memory structure stores dynamically allocated elements.

12. The system of claim 10, wherein the set of copy functions is for:
    defining a first number of variables in the stack memory structure, the first number being less than a number of the set of memory locations in the heap memory structure;
    defining a second number of the memory locations in the heap memory structure; and
    for each of a number of memory locations in the heap memory structure corresponding to the first number, modifying the portion of the source code to copy the content of the location into a corresponding variable in the stack memory structure.

13. The system of claim 11, wherein the set of protection functions further comprises a garbage value function that instantiates at least one garbage variable onto the stack memory structure during execution of the protected portion of the computer program source code in order to obfuscate the variables in use by the computer program source code.

14. The system of claim 10, wherein the protected portion is equivalent but not identical to the portion before it was protected.

15. The system of claim 10, wherein the set of copy functions copies less than the entire set of memory locations in the heap memory structure to variables in the stack memory structure.

16. The system of claim 10, wherein the heap memory structure is a buffer.

17. The system of claim 10, wherein the portion is a function and the variables are local variables of said function.

18. A non-transitory machine readable medium storing a program which when executed by at least one processing unit protects computer program source code, the program comprising sets of instructions for:

receiving a portion of computer program source code that accesses a set of memory locations in a heap memory structure, the portion comprising a set of references to the set of memory locations;

protecting the portion of the computer program source code by modifying the portion to include a set of protection functions, the set of protection functions comprising:

a set of copy functions that each copies contents of a different one of the set of memory locations in the heap memory structure to an associated variable in a stack memory structure;

a set of reference functions that removes and replaces each of a plurality of the references to the memory locations copied by the set of copy functions with new references to the variables in the stack memory structure that are associated with the copied memory locations;

a reset function that, after completion of execution of the protected portion using the new references added by the set of reference functions, copies a current value stored in each variable in the stack memory structure that is associated with a copied memory location back to the associated copied memory location in the heap memory structure; and compiling the computer program source code after the portion has been protected.

19. The non-transitory machine readable medium of claim 18, wherein the heap memory structure stores dynamically allocated elements.

20. The non-transitory machine readable medium of claim 18, wherein the heap memory structure is a buffer.

21. The non-transitory machine readable medium of claim 18, wherein the portion is a function and the variables are local variables of said function.

\* \* \* \* \*